Patented June 18, 1929.

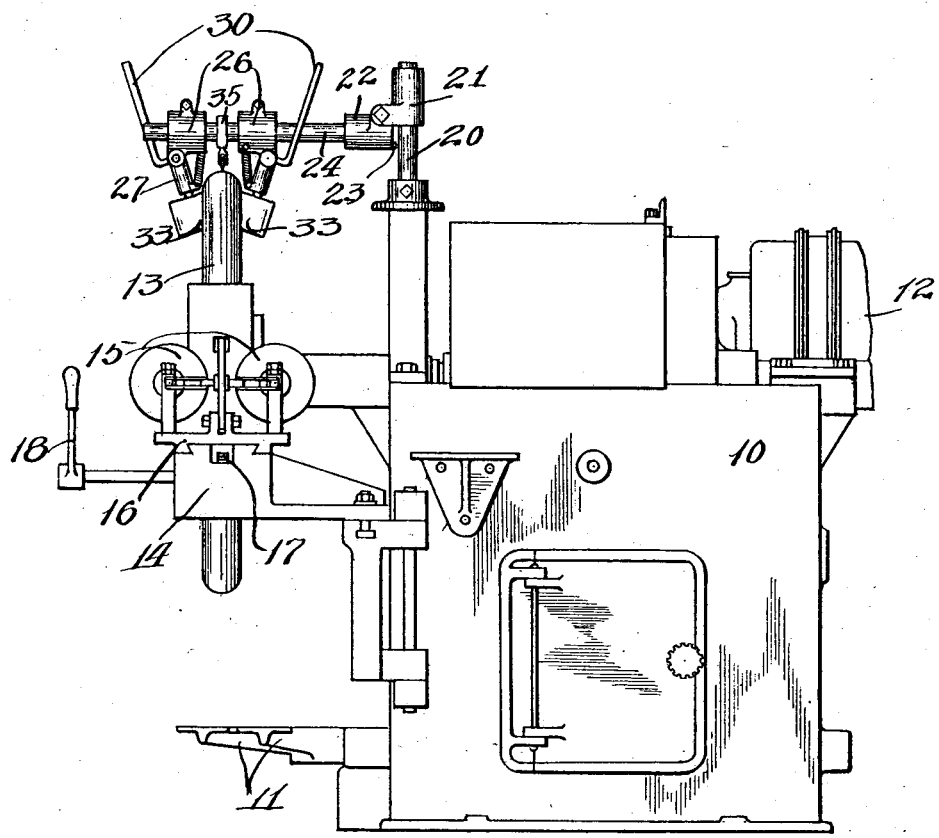

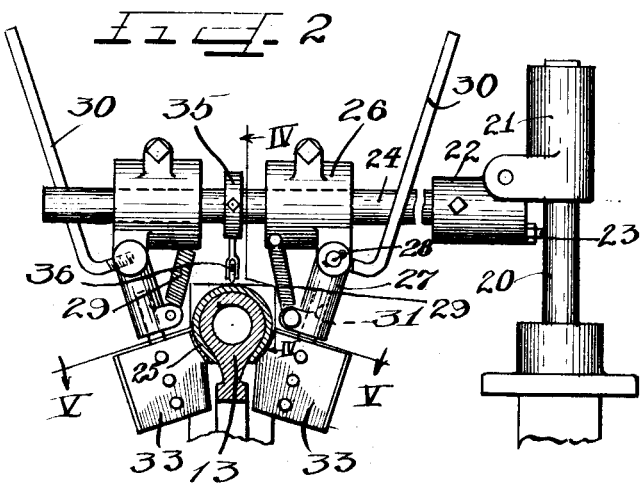

1,717,710

UNITED STATES PATENT OFFICE.

ARNOLD R. KRAUSE AND HOWARD O. HUTCHENS, OF EAU CLAIRE, WISCONSIN, ASSIGNORS TO GILLETTE RUBBER COMPANY, OF EAU CLAIRE, WISCONSIN, A CORPORATION OF DELAWARE.

CHAFER-APPLYING MACHINE.

Application filed June 23, 1927. Serial No. 200,815.

This invention relates to tire building machinery and especially to an improved mechanism for assisting in the manual application of chafer strips to the side surfaces of a tire carcass.

Heretofore, an important difficulty in tire building has resulted in unavoidable variations in the manual stretching and handling of strips of stock during the preliminary application thereof to the crowned or annular surface of a tire carcass, as the side wall chafer strips are stretched at the top and gathered or shrunk at the bottom at the same time. With bias cut fabric, such stretching at the top helps the gathering at the edge, but the manual application thereof is correspondingly difficult. It is accordingly an object of this invention to provide an improved applying device for chafer strip stock that will form and position the side wall portions of the stock while the operator applies tension to the material as fed thereto.

It is also an object of this invention to provide an improved mounting for permitting quick positioning and removal of the device of this invention.

Other and further important objects of this invention will be apparent from the disclosures in the specification and the accompanying drawings.

This invention (in a preferred form) is illustrated in the drawings and hereinafter more fully described.

On the drawings:

Figure 1 is an elevation of a tire building machine to which a device embodying the features of this invention has been applied.

Figure 2 is an elevational view of the device of this invention with a tire core shown in position in section.

Figure 3 is an end view of the device.

Figure 4 is a section on the line IV—IV of Figure 2.

Figure 5 is a section on the line V—V of Figure 2.

As shown on the drawings:

The tire building machine chosen for illustration in Figure 1 comprises a frame or housing 10 containing the driving and control mechanism, a pair of control treadles being indicated at 11 and a driving motor at 12. A tire mandrel 13 is shown at the left; a swinging table 14 carrying a pair of stitcher rolls 15 mounted on a carriage 16 which is moved in and out by a rack and pinion 17 operated by a hand lever 18. This structure is merely outlined to show the application of the device of this invention thereto, a vertically adjustable post 20 being mounted on the frame 10 and provided with a fixed collar 21 to which is pivoted a similar collar 22 which carries an adjusting screw 23 bearing against the post when the collar 22 is horizontal. This collar 22 forms a socket for a bar 24 fixed therein, this mounting being provided to allow the bar carrying the device of this invention to be swung up out of the way when not needed.

In the manufacture of tire carcasses prior to vulcanization, the core or tire mandrel 13 is rotated and the various layers of fabric, cushion rubber, breaker strip, beads and bead flippers, and tread stock are applied one layer at a time and stretched and stitched to the desired tire cross section by a combination of hand stretching and stitching by means of the stitcher rolls 15 which are gradually shifted over the surface of the tire cross section to iron out air pockets and wrinkles, the stitching rolls being shiftable to work down over the side walls of the tire carcass. The present invention relates to the application of the chafter or side wall cover stock which the stitching mechanism then rolls down into solid contact with the fabric or cord carcass previously built up on the mandrel 13. For clearness in the drawings, Figure 2 shows only a single layer of material 25 applied directly to the core or mandrel as it is considered unnecessary to show the tire carcass in detail.

The apparatus of this invention comprises duplicate members applied to the bar 24 on either side of the center line of the tire mandrel, so that in the following description, the same numerals will be applied to each. Split collars 26 are clamped to the bar 24, the location of these collars varying to suit the particular tire size under construction. These collars carry depending arms 27 pivoted at 28 and inwardly urged by springs 29, the arms being provided with upstanding levers 30 to be operated to open up the arms when the bar 24 is to be swung upwardly out of the way. The lower ends of the arms form sockets 31 for adjustable bars 32, the lower ends of which support inclined plows 33 which push the stock inwardly against the side walls of the carcass, the material being so tacky that it becomes attached whenever it touches so that the ends 34 of the plows nearest the mandrel are curved to closely conform to the shape of the mandrel.

A collar 35 is clamped to the bar 24 at the center line of the mandrel, and pivotally supports a trailing roller 36 which serves as a marker or guide for feeding the stock in centered relationship, this roller riding up over the stock without applying appreciable pressure thereto.

In the operation of this device, after the layers of cord or fabric are built up on the mandrel, the bars 24 is swung down into a horizontal position while the levers 30 are held together to open the arms 27 after which release of the levers causes the arms to move inwardly until the plows 33 carried thereby contact the side walls of the tire carcass. Then one end of a prepared strip of chafer stock is applied to one side of the tire carcass and the mandrel started up by means of the foot control levers, the operator applying suitable tension to the stock to stretch and gather the same as the rotating mandrel draws the stock between the plows which apply the stock to the tire carcass. After one side strip has been applied in this manner, the other side strip is then applied and the stitching mechanism is operated to secure a smooth bond.

It will thus be seen that we have produced an improved device for applying chafer strips to a tire carcass, the device greatly simplifying the application of such material by preliminary forming the material into the shape of the tire carcass, thus reducing the work of stitching the material into shape and preventing the formation of wrinkles due to the extreme distortion required in the stock.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. In a device of the class described, a swingable unit cooperable with a tire mandrel during the building up of a carcass on the mandrel and comprising plows positioned on the sides of the tire carcass for curving and applying a strip of stock to the curved surface of the tire carcass on the mandrel, each of said plows having a concave surface for engaging the strip as it is applied to said carcass.

2. In a device of the class described, guiding means for centering a strip of stock while the stock is being applied to a rotating tire carcass, and plows positioned on either side of the tire carcass, each having a curved segmental surface for curving and applying the stock to the curved surface of the tire carcass.

In testimony whereof, we have hereunto subscribed our names.

ARNOLD R. KRAUSE.
HOWARD O. HUTCHENS.